Sept. 15, 1959 　　　H. H. FREEMAN 　　　2,904,754
GALVANOMETER SUPPORT
Filed July 11, 1955 　　　2 Sheets-Sheet 1

INVENTOR.
HOLLAND HEDGES FREEMAN
BY
Christie, Parker & Hale
ATTORNEYS

Sept. 15, 1959     H. H. FREEMAN     2,904,754
GALVANOMETER SUPPORT
Filed July 11, 1955     2 Sheets-Sheet 2

INVENTOR.
HOLLAND HEDGES FREEMAN
BY
Christie, Parker & Hale
ATTORNEYS

United States Patent Office 2,904,754
Patented Sept. 15, 1959

2,904,754

GALVANOMETER SUPPORT

Holland Hedges Freeman, San Gabriel, Calif., assignor, by mesne assignments, to Consolidated Electrodynamics Corporation, Pasadena, Calif., a corporation of California Application July 11, 1955, Serial No. 521,088

4 Claims. (Cl. 324—156)

This invention relates to galvanometer supports and has particular reference to apparatus for supporting miniature galvanometers in a magnetic field.

It is common practice to utilize a number of miniature galvanometers as components in recording oscillographs and the like. Each miniature galvanometer ordinarily includes a coil-and-mirror arrangement suspended inside a case by a pair of ribbons or wires, a pair of pole pieces extending through the front side and the back side of the case respectively, and a window in the front side of the galvanometer case for transmitting light to and from the galvanometer mirror.

In recording oscillographs an electrical signal of interest is applied through the coil of a galvanometer. The galvanometer is supported in a magnetic field so that its mirror will deflect an angular distance which is proportional to the applied signal. A light source shines light through the galvanometer window and onto the mirror, and the light is reflected by the mirror through an optical system to produce a trace on photosensitive paper in accordance with mirror movement.

Since the galvanometer mirror is a part of an optical system, its position and orientation is important and further, when a number of galvanometers are used to record a plurality of traces on photosensitive paper, the problem of accurately positioning the galvanometers becomes difficult.

Usually a mounting block is employed to accurately support the galvanometers in a magnetic field, the mounting block having a plurality of slots which receive the pole pieces of the galvanometers, and means for controlling the forward and backward tilt of each galvanometer. Each of the galvanometers has a built-in adjustment for the angle of zero deflection of its mirror, and the means for controlling the forward and backward tilt of the galvanometers complements the built-in adjustment so that the angular orientation of each of the galvanometer mirrors is completely adjustable. Mounting blocks are metallic so that they may be magnetized by a suitable magnet to provide the magnetic field for the operation of the galvanometers, with the respective pole pieces of the galvanometers serving both to support the galvanometers and to increase the magnetic field strength in the vicinity of the coils of the galvanometers.

Conventionally, the supporting block or blocks for the galvanometers involve very close manufacturing tolerances with the galvanometers being held by frictional contact provided by spring arrangements and associated structure so that they may be tilted forward and backward to orient the reflected image from the galvanometer mirror. The conventional spring arrangements and associated structure are relatively complicated and expensive, yet they permit the galvanometers to work upwardly out of position in response to adjustments of the tilted position from time to time.

The apparatus of the invention is substantially simpler and less expensive than conventional galvanometer support apparatus, and it eliminates the problem of creeping of the galvanometer upwardly in the slots. The apparatus of the invention utilizes support means having slots for supporting at least one galvanometer with the galvanometer being free to be tilted in one plane. A plate means is connected to the support means and it has an edge which engages one side of the galvanometer for providing a detent action and a pivot axis for the galvanometer. Spring means are connected to the support means for engaging the opposite side of the galvanometer and urging the galvanometer about the pivot axis, and adjustable mechanical means are connected to the support means for engaging the said opposite side of the galvanometer and pivoting the galvanometer about the pivot axis against the action of the spring means.

In a preferred embodiment of the invention, the support means includes a first support block having a plurality of slots spaced along one face and a second support block having a plurality of slots spaced along one face, the second support block being disposed approximately parallel to and at a distance from the first support block with the respective sets of slots being disposed facing each other, forming a plurality of slot pairs for severally receiving and supporting a corresponding plurality of encased galvanometers. Each of the galvanometers has a notch provided in one side of its case. The plate means is connected to the first support block and it has a knife edge which engages the notches in the respective galvanometer cases for providing a detent action and a pivot axis for the galvanometers. The adjustable mechanical means includes a plurality of plungers slidably mounted atop the second supporting block for severally engaging the respective galvanometer cases and pivoting the cases about the pivot axis. The spring means is connected to the second support block and is shaped like a comb with a top plate and a plurality of integral depending arms which severally engage the respective galvanometer cases and urge the cases about the pivot axis against the respective plungers.

The invention is explained in detail with reference to the preferred embodiment as shown in the drawings, in which.

Figure 1:
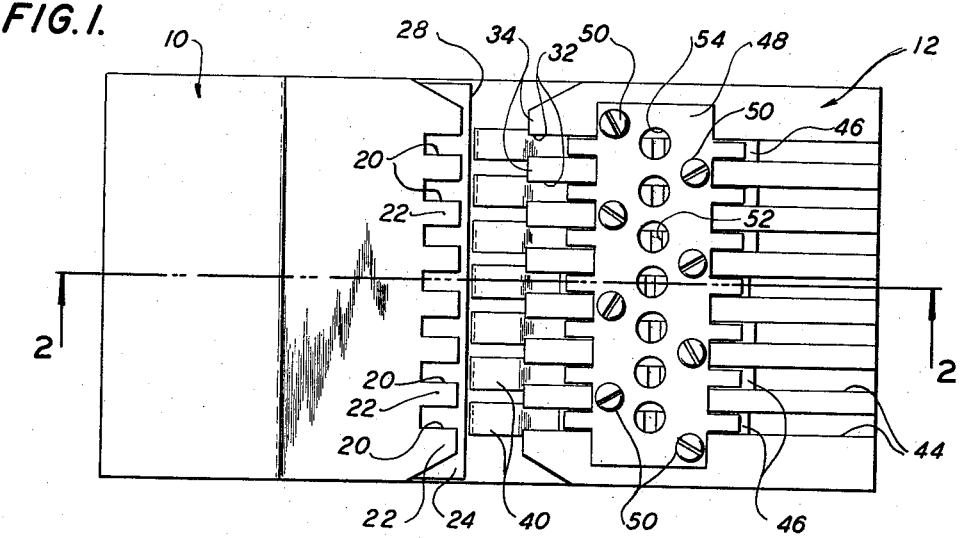
Fig. 1 is a top view of the preferred embodiment of the invention.
Figure 2:
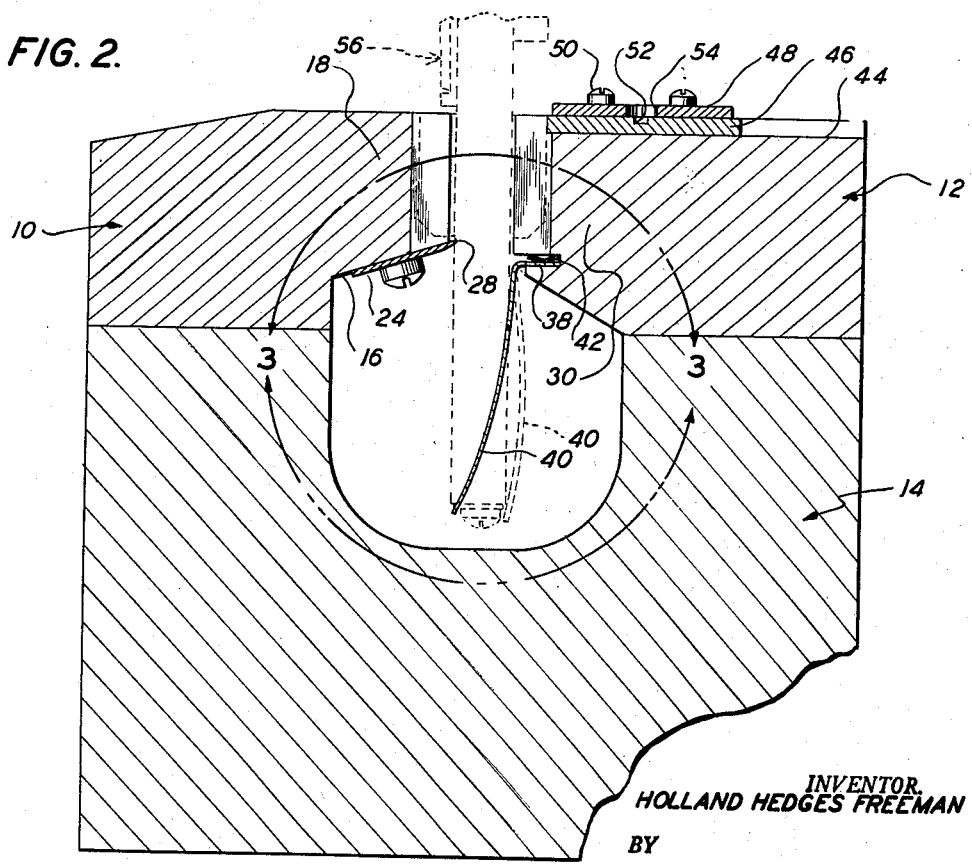
Fig. 2 is a view taken along line 2—2 of Fig. 1.

With reference to Figs. 1 and 2, a first support block 10 and a second support block 12 are connected respectively to opposite poles of a U-shaped magnet 14. The blocks are disposed parallel to each other and separated a short distance apart.

The first block is undercut as shown at 16 on its side proximate to the second block leaving a protruding portion 18 which extends toward the second block. A plurality of equally spaced vertical slots 20 are cut through the forwarding extremity of the protruding portion 18, thus leaving a corresponding plurality of vertical teeth 22 which separate the slots from one another.

A galvanometer down-stop plate 24 is connected to the undercut portion of the first mounting block by a plurality of screws 26. The plate has a knife edge 28 which protrudes a small distance in front of the plurality of teeth 22 in a uniform manner transversely to the slots along the length of the block.

The second mounting block has a protruding portion 30 which protrudes from the side of the block proximate to the first mounting block. A plurality of vertical slots 32 are cut at equally spaced locations along the length of the forward extremity of the protruding portion 30, thus forming a corresponding plurality of vertical teeth 34. The slots in the second mounting block are in line with and face toward the slots in the first mounting block, thereby forming a plurality of slot pairs.

The protruding portion 30 of the second mounting block has a groove 36 cut along the length of its forward face directly beneath the plurality of teeth 34. A spring plate 38, having a plurality of leaf springs 40 formed integrally therewith and depending from the plate like a comb, fits into the groove 36 and is held therein by pressure from a wedge-shaped plate 42. Each of the depending leaf springs is in line with a pair of vertical slots of the respective pluralities of slots 20 and 32 and slopes downwardly in the direction from the second mounting block toward the first mounting block.

A plurality of channels 44 are cut in the top face of the second mounting block and in line with respective pairs of slots. A corresponding plurality of plungers 46 are slidably contained in the channels 44 by a top plate 48 connected to the second mounting block by a plurality of screws 50 which extend through the plate and connect to the block at positions intermediate the channels. Each plunger has a recess 52 in its top face which is in line with a corresponding one of a plurality of openings 54 through the top plate. The location of the plungers may be adjusted by inserting a screwdriver or the like in the recess 52 so that the plungers may be moved forward or backward.

Figure 3:
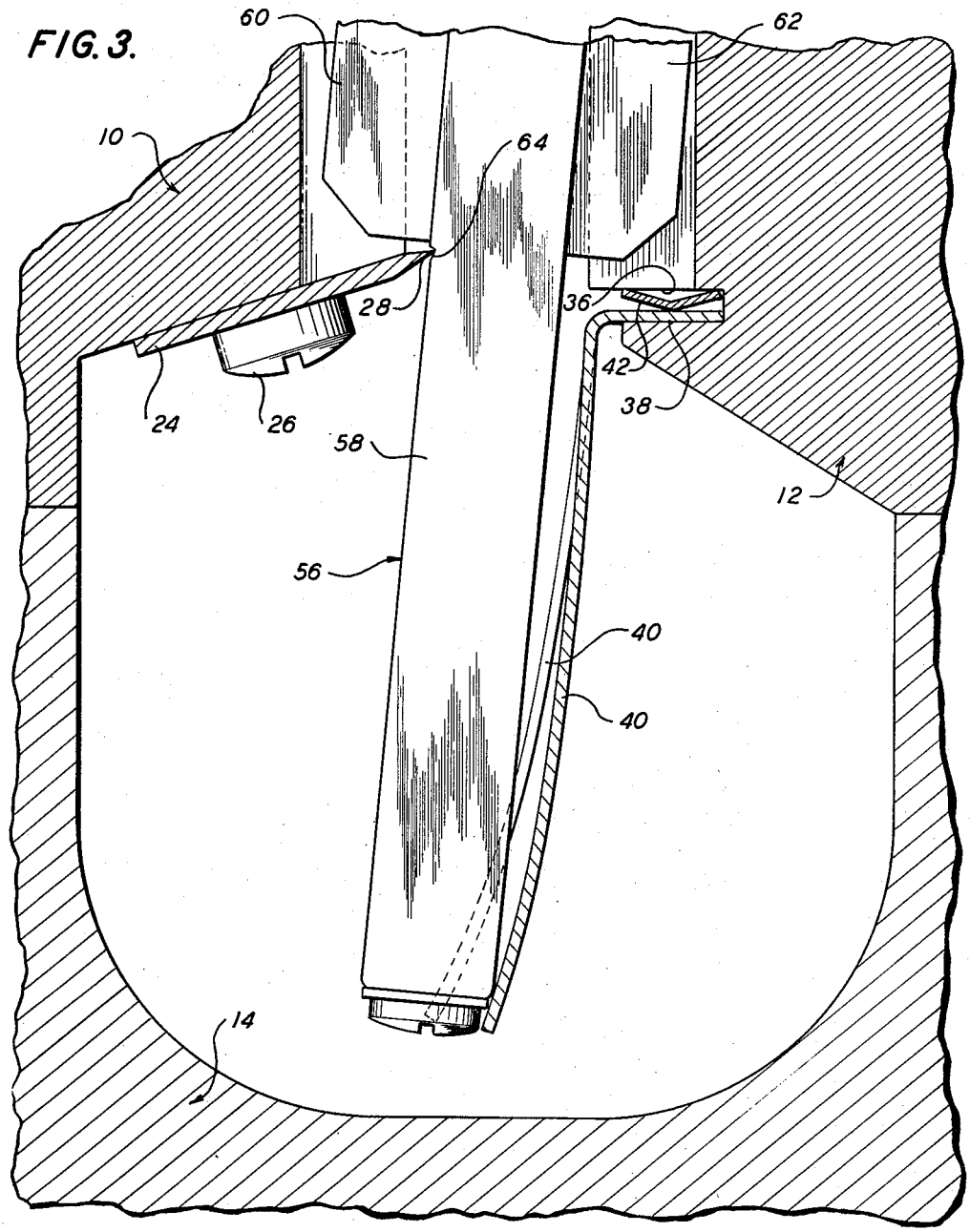
Fig. 3 is an enlarged fragmentary view taken in area 3—3 of Fig. 2.

Figs. 2 and 3 show the operation of the apparatus of the invention. A miniature galvanometer 56 having a case 58, with a front pole piece 60 and a back pole piece 62 extending from the case, is inserted into a pair of corresponding slots in the mounting blocks. The pair of slots provides a tight fit for the pole pieces in the lateral direction but leaves the galvanometer free to be tilted in the plane of the slots. The galvanometer has a small notch 64 cut in its case transverse to and directly beneath the front pole piece. As the galvanometer is pushed down into the pair of slots, the knife edge of the down-stop plate slips into the notch in the galvanometer case with its upper extremity preventing further downward movement of the galvanometer, and thus providing an accurate positioning of the galvanometer in the vertical direction. At the same time, a corresponding leaf spring of the plurality of leaf springs 40 engages the lower part of the back side of the galvanometer case and urges the galvanometer to pivot about the axis formed by the knife edge of the down-stop plate, forcing the back pole piece against a corresponding plunger of the plurality of plungers 46.

As shown in dotted lines in Fig. 2 and in solid lines in Fig. 3, when the galvanometer 56 is inserted into the mounting blocks, the down-stop plate provides a detent action which prevents the galvanometer from working upwards, and the position of the corresponding plunger may be adjusted to pivot the galvanometer about the pivot axis provided by the knife edge of the down-stop plate against the action of the spring.

This structure provides a three-point contact and eliminates all play from the galvanometer in the plane of the slots. The simplification resulting from the use of a single down-stop plate and an integral comb-shaped spring substantially reduces the cost of the apparatus of the invention over conventional apparatus.

I claim:

1. Apparatus for pivotably supporting a plurality of miniature galvanometers each having a case with a notch disposed in one side of the case, said apparatus comprising support block means having a plurality of openings for receiving and supporting the respective galvanometers so that the galvanometers are free to be tilted in one plane, a galvanometer down-stop plate connected to the support block means and having a knife edge disposed transversely of said openings which engages the notch in the respective galvanometer cases for proving detent action and acting as a pivot axis for the galvanometers, a plurality of springs connected to the support block means for severally engaging the respective galvanometers and urging the galvanometers about the pivot axis provided by the knife edge, and adjustable mechanical means connected to the support block means which adjustable means severally engage the respective galvanometer cases for pivoting the galvanometers about the pivot axis against the action of the respective springs, said springs and adjustable mechanical means engaging the several galvanometers on opposite sides of the pivot axis from one another and both in opposition to the knife edge.

2. Apparatus for supporting a plurality of galvanometers each having a case with a notch disposed in one side of the case, said apparatus comprising support block means having a plurality of slots for supporting the respective galvanometers, a down-stop plate connected to the support block means and having an edge which engages the notch in the respective galvanometer cases for providing detent action and a pivot axis for the galvanometers, a plurality of adjustable plungers connected to the support block means which plungers severally engage the respective galvanometer cases on one side of the pivot axis for pivoting the cases about the pivot axis provided by the down-stop plate, and means for spring loading the respective galvanometer cases on the opposite side of the pivot axis and against the action of the respective plungers, both the plungers and the springs engaging the galvanometers in opposition to the knife edge.

3. Apparatus for supporting a plurality of galvanometers each having a case with a notch disposed in one side of the case, said apparatus comprising support block means having a plurality of slots for supporting the respective galvanometers with the galvanometers being free to be tilted in one plane, a galvanometer down-stop plate connected to the support block means and having a knife edge which engages the notches in the respective galvanometer cases for providing detent action and a pivot axis, a plurality of plungers slidably connected to the supporting block means which plungers severally engage the respective galvanometer cases for pivoting the cases about the pivot axis provided by the knife edge of the down-stop plate, and a spring member connected to the support block means, the spring member being shaped like a comb with a top plate and a plurality of integral depending arms which severally engage the respective galvanometer cases and urge the cases about the pivot axis against the respective plungers, the spring and the plungers engaging the galvanometers on opposite sides of the pivot axis from one another and both in opposition to the knife edge.

4. Apparatus for supporting a plurality of galvanometers each having a case, a front and a back pole piece protruding from the case and a notch in the front side of the case, said apparatus comprising a first support block having a plurality of slots spaced along one face for receiving the front pole pieces of the respective galvanometers, a second support block having a plurality of slots spaced along one face for receiving the back pole pieces of the respective galvanometers, the second support block being disposed approximately parallel to and at a distance from the first support block with the respective pluralities of slots being disposed facing each other and forming a plurality of slot pairs for receiving the pole pieces of the respective galvanometers concurrently, a down-stop plate connected to the first support block and having a knife edge for engaging the notches in the front sides of the respective galvanometer cases to act as a detent and as a pivot axis, a plurality of plungers slidably mounted atop the second supporting block for severally engaging the back sides of the respective galvanometer cases at a position above the knife edge and pivoting the cases about the knife edge, and a spring member connected to the second support block, the spring member being shaped like a comb with a top plate and a plurality of integral depending arms which severally engage the back sides of the respective galvanometer cases at a position below the knife edge and urge the cases about the knife edge against the respective plungers.

References Cited in the file of this patent

UNITED STATES PATENTS

| | | |
|---|---|---|
| 2,268,526 | Palmer | Dec. 30, 1941 |
| 2,389,081 | Redmond | Nov. 13, 1945 |
| 2,425,407 | Washburn | Aug. 12, 1947 |
| 2,439,576 | Morrow | Apr. 13, 1948 |
| 2,469,265 | Hathaway | May 3, 1949 |
| 2,571,776 | Staff | Oct. 16, 1951 |
| 2,599,661 | Richardson | June 10, 1952 |
| 2,698,417 | Hathaway | Dec. 28, 1954 |

UNITED STATES PATENT OFFICE
CERTIFICATE OF CORRECTION

Patent No. 2,904,754                                           September 15, 1959

Holland Hedges Freeman

It is hereby certified that error appears in the printed specification of the above numbered patent requiring correction and that the said Letters Patent should read as corrected below.

Column 3, line 73, claim 1, for "proving" read -- providing --.

Signed and sealed this 1st day of March 1960.

(SEAL)
Attest:

KARL H. AXLINE
Attesting Officer

ROBERT C. WATSON
Commissioner of Patents